(12) United States Patent
Pellet-Rostaing et al.

(10) Patent No.: US 11,466,341 B2
(45) Date of Patent: Oct. 11, 2022

(54) EXTRACTANT FOR RARE EARTH EXTRACTION FROM AQUEOUS PHOSPHORIC ACID SOLUTIONS AND METHOD OF EXTRACTION

(71) Applicants: COMMISSARIAT À L'ÉNERGIE ATOMIQUE ET AUX ÉNERGIES ALTERNATIVES, Paris (FR); CENTRE NATIONAL DE LA RECHERCHE SCIENTIFIQUE, Paris (FR); UNIVERSITE DE MONTPELLIER, Montpellier (FR)

(72) Inventors: Stéphane Pellet-Rostaing, Villeurbanne (FR); Julien Rey, Avignon (FR); Sandrine Dourdain, Tresques (FR); Guilhem Arrachart, Saint-Laurent-des-Arbres (FR); Sefkan Atak, Lingolsheim (FR)

(73) Assignees: COMMISSARIAT Á L'ÉNERGIE ATOMIQUE ET AUX ÉNERGIES ALTERNATIVES, Paris (FR); CENTRE NATIONAL DE LA RECHERCHE SCIENTIFIQUE, Paris (FR); UNIVERSITE DE MONTPELLIER, Montpellier (FR)

( * ) Notice: Subject to any disclaimer, the term of this patent is extended or adjusted under 35 U.S.C. 154(b) by 721 days.

(21) Appl. No.: 16/331,264

(22) PCT Filed: Sep. 14, 2017

(86) PCT No.: PCT/FR2017/052458
§ 371 (c)(1),
(2) Date: Mar. 7, 2019

(87) PCT Pub. No.: WO2018/051026
PCT Pub. Date: Mar. 22, 2018

(65) Prior Publication Data
US 2019/0218643 A1 Jul. 18, 2019

(30) Foreign Application Priority Data
Sep. 15, 2016 (FR) .................................... 1658626

(51) Int. Cl.
*C22B 59/00* (2006.01)
*C22B 3/28* (2006.01)
*C22B 3/38* (2006.01)
*C22B 3/32* (2006.01)

(52) U.S. Cl.
CPC .............. *C22B 59/00* (2013.01); *C22B 3/282* (2021.05); *C22B 3/322* (2021.05); *C22B 3/3844* (2021.05); *Y02P 10/20* (2015.11)

(58) Field of Classification Search
CPC ......... C22B 59/00; C22B 3/282; C22B 3/322; C22B 3/3844; Y02P 10/20

USPC ........................................................ 423/21.5
See application file for complete search history.

(56) References Cited

U.S. PATENT DOCUMENTS

| | | | |
|---|---|---|---|
| 2013/0343969 A1* | 12/2013 | Bromberg | B01J 45/00 423/7 |
| 2015/0133688 A1* | 5/2015 | Arrachart | C07F 9/3808 423/9 |
| 2018/0142321 A1 | 5/2018 | Mary et al. | |
| 2018/0230572 A1 | 8/2018 | Turgis et al. | |

FOREIGN PATENT DOCUMENTS

| | | | |
|---|---|---|---|
| FR | 3002951 A1 | 9/2014 | |
| WO | 2013/059352 A1 | 4/2013 | |
| WO | WO-2013146472 A1 * | 10/2013 | C22B 3/26 |

(Continued)

OTHER PUBLICATIONS

Corinne Verdier-Erlinger "Towards a physical interpretation of third phase formation in liquid-liquid extraction. Application to the Diamex process for the treatment of high radioactive nuclear wastes.", Jul. 24, 1998, XP055367799 1998, (Year: 1998).*

(Continued)

*Primary Examiner* — Steven J Bos
(74) *Attorney, Agent, or Firm* — Pearne & Gordon LLP

(57) ABSTRACT

An extractant which makes it possible to extract both light rare earths and heavy rare earths from an aqueous phosphoric acid solution, likely to be present in this solution, and which is characterised in that it comprises: a compound of formula (I) below:

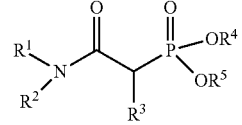

wherein R1 and R2, identical or different, are a hydrocarbon group, saturated or unsaturated, linear or branched, in C6 to C12; R3 is a hydrocarbon group, in C1 to C6, or a hydrocarbon group, saturated or unsaturated, monocyclic, in C3 to C8; R4 and R5, identical or different, are a hydrogen atom or a hydrocarbonate group, saturated or unsaturated, linear or branched, in C2 to C8; and a surfactant. Applications of this extractant include treatment of aqueous solutions from the leaching of natural phosphates by sulphuric acid and aqueous solutions from the leaching of urban minerals by phosphoric acid, in view of making profitable use of the rare earths present in these solutions.

19 Claims, 5 Drawing Sheets

(56) References Cited

FOREIGN PATENT DOCUMENTS

WO  WO-2013167516 A1 * 11/2013 .............. C07F 9/572
WO     2014/139869 A1    9/2014

OTHER PUBLICATIONS

International Search Report for PCT/FR2017/052458 dated Nov. 27, 2017.
Written Opinion for PCT/FR2017/052458 dated Nov. 27, 2017.
French Search Report for FR1658626 dated Apr. 27, 2017.
International Preliminary Report on Patentability for PCT/FR2017/052458 dated Nov. 9, 2018.
Corinne Verdier-Erlinger "Towards a physical interpretation of third phase formation in liquid-liquid extraction. Application to the Diamex process for the treatment of high radioactive nuclear wastes.", Jul. 24, 1998, XP055367799 1998.
A. V. Legin et al. "Cross-sensitive rare earth metal ion sensors based on extraction systems", Sensor and Actuators B: Chemical 2008, 131(1), pp. 29-36.
M. Krea et al., "Liquid-liquid extraction of uranium and lanthanides from phosphoric acid using a synergistic DOPPA-TOPO mixture," Hydrometallurgy, 2000, 58(3), pp. 215-225.
R. Farn, Chemistry and Technology of Surfactants, 2006, Blackwell Publishing Ltd, ISBN-13: 978-14051-2696-0.
R. Turgis et al., "Carbamoylalkylphosphonates for Dramatic Enhancement of Uranium Extraction from Phosphates Ores," Solvent Extraction and Ion Exchange 2014, 32(7), pp. 685-702.

\* cited by examiner

EXTRACTANT FOR RARE EARTH EXTRACTION FROM AQUEOUS PHOSPHORIC ACID SOLUTIONS AND METHOD OF EXTRACTION

CROSS-REFERENCE TO RELATED APPLICATIONS

This is a National Stage application of PCT international application PCT/FR2017/052458, filed on Sep. 14, 2017, which claims the priority of French Patent Application No. 16 58626, filed Sep. 15, 2016, both of which are incorporated herein by reference in their entireties.

TECHNICAL FIELD

The invention pertains to the field of the extraction and recovery of rare earths contained in natural or urban ores.

More specifically, the invention relates to a novel extractant allowing the extraction from an aqueous phosphoric acid solution of both light rare earths and heavy rare earths which may be contained in this aqueous solution, with high extraction yields and high selectivity over metal impurities which are possibly also contained in said solution, iron in particular, irrespective of the phosphoric acid concentration of said aqueous solution.

It also relates to the use of this novel extractant for the extraction of at least one rare earth from an aqueous phosphoric acid solution.

It also relates to methods for extracting and recovering at least one rare earth contained in an aqueous phosphoric acid solution using this novel extractant.

The invention also finds application in the treatment of aqueous solutions derived from the leaching of natural phosphates with sulfuric acid and of aqueous solutions derived from the leaching of urban ores with phosphoric acid in order to recover the rare earths contained in these aqueous solutions.

STATE OF THE PRIOR ART

Rare earths group together metals characterized by similar properties, namely scandium (Sc), yttrium (Y) and all lanthanides, the latter corresponding to the 15 chemical elements listed in Mendeleïev's periodic table of elements and having an atomic number ranging from 57 for lanthanum (La) to 71 for lutetium (Lu).

The close properties of rare earths are related to their particular electron configuration and in particular to their non-saturated 4f electron sub-level imparting unique chemical, structural and physical properties thereto. These properties are used to advantage in industrial applications that are as varied as they are sophisticated: metallurgy, catalysis, glass, optics, ceramics, luminescence, magnetism, electronics, etc.

Rare earths therefore belong to so-called «technological» metals the supply of which is strategic but also threatened under increasing world demand for these particular metals.

Contrary to the indication of their name, rare earths are widely found in nature. For example, they are contained in numerous natural ores and in particular in natural phosphates (or phosphate ores) that are mined for the production of phosphoric acid and phosphate fertilizers.

Since rare earths enter into the manufacture of numerous items of technological equipment, the industrial and domestic waste derived from such equipment and in particular electrical and electronic waste known as WEEE or W3E represent another source for accessing rare earths. The treatment of such waste to recover the rare earths contained therein is therefore the focus of much attention.

The treatment of natural phosphates for the production of phosphoric acid and phosphate fertilizers starts with the attack or leaching of these phosphates, previously crushed and ground, with an acid that is most often sulfuric acid which converts tricalcium phosphate to phosphoric acid $H_3PO_4$ having 30% phosphate anhydride $P_2O_5$, and to insoluble calcium sulfate (gypsum).

This acid attack partly or fully solubilizes the metals contained in natural phosphates, including rare earths, which are therefore found in the aqueous phosphoric acid solution.

One manner in which to recover rare earths from an aqueous phosphoric acid solution is to subject this aqueous solution, after filtration and concentration, to hydrometallurgical treatment based on the liquid-liquid extraction technique, a technique which consists in placing said aqueous solution in contact with an organic solution comprising one or more extractants in a diluent, to obtain extraction of rare earths, said extraction preferably being simultaneously selective and high-performing.

To recover rare earths from an aqueous phosphoric acid solution, the use of a certain number of extractants has been proposed including that of n-octylpyrophosphoric acid or OPPA, di-2-ethylhexylphosphoric acid or DEHPA, and a mixture of mono(n-octyl-phenyl)phosphoric acid or MOPPA and di(n-octophenyl)phosphoric acid or DOPPA, alone or in a mixture with tri-n-octylphosphine oxide or TOPO, in solution in kerosene.

Yet these extractants do not give full satisfaction.

For example, in addition to the fact that DEHPA leads to selective extraction of heavy rare earths, i.e. with an atomic number of at least 62 (samarium, europium, gadolinium, terbium, dysprosium, holmium, erbium, thulium, ytterbium and lutetium), it only allows the extraction of these heavy rare earths from a highly acid aqueous solution (pH<1).

In addition, while it has been shown by M. Krea and H. Khalaf (*Hydrometallurgy* 2000, 58(3), 215-225), referenced [1] below) that lanthanum, europium and yttrium can be extracted with high yields (65%, 70% and 83% respectively) from an aqueous phosphoric acid solution having 30% $P_2O_5$ (i.e. 5.5 M) free of iron, with a mixture of DOPPA and TOPO in kerosene, it was also evidenced by these Authors that these extraction yields show a drastic drop in the presence of iron on account of the fact that DOPPA is a strong extractant of this metal.

Yet, since iron is the chief metal impurity in aqueous phosphoric acid solutions derived from the leaching of natural phosphates with sulfuric acid, the use of a mixture of extractants having strong affinity for iron, such as the one used in reference [1], cannot be envisaged to extract rare earths from such solutions on an industrial scale.

The Inventors therefore set themselves the objective of providing a novel extractant devoid of the different disadvantages suffered by the extractants whose use has been proposed up until now for extracting rare earths from an aqueous phosphoric acid solution.

In particular, their aim was for this extractant to allow the highly efficient extraction of both light rare earths and heavy rare earths from an aqueous phosphoric acid solution containing these rare earths, both with good selectivity over metal impurities which may also be contained in this aqueous solution, over iron in particular, and over a range of phosphoric acid concentrations that is as broad as possible.

As part of their work, the Inventors have unexpectedly ascertained that the use of some bifunctional compounds, having an amide function and phosphonic or phosphonate function, in a mixture with an anionic or non-ionic surfactant, allows the extraction of light and heavy rare earths from an aqueous phosphoric acid solution with high performance—due to the existence of a synergic effect between these compounds and the surfactant—and in a particularly selective manner over metal impurities, irrespective of the phosphoric acid concentration of this aqueous solution.

It is on these findings that the invention is based.

SUMMARY OF THE INVENTION

The subject of the invention is first an extractant or extracting agent characterized in that it comprises:
a compound of formula (I) below:

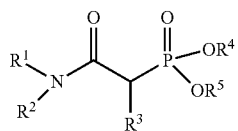

(I)

where:
$R^1$ and $R^2$, either identical or different, are a saturated or unsaturated, linear or branched hydrocarbon group having 6 to 12 carbon atoms;
$R^3$ is:
a saturated or unsaturated, linear or branched hydrocarbon group having 1 to 12 carbon atoms and optionally one or more heteroatoms; or
a saturated or unsaturated, monocyclic hydrocarbon group having 3 to 8 carbon atoms and optionally one or more heteroatoms; whilst
$R^4$ and $R^5$, either identical or different, are a hydrogen atom or saturated or unsaturated, linear or branched hydrocarbon group having 2 to 8 carbon atoms; and
a surfactant.

In the foregoing and in the remainder hereof, by "saturated or unsaturated, linear or branched hydrocarbon group having 6 to 12 carbon atoms" it is meant any straight-chain or branched alkyl, alkenyl or alkynyl group, having 6, 7, 8, 9, 10, 11 or 12 carbon atoms.

Similarly, by "saturated or unsaturated, linear or branched hydrocarbon group having 2 to 8 carbon atoms" it is meant any straight-chain or branched alkyl, alkenyl or alkynyl group, having 2, 3, 4, 5, 6, 7 or 8 carbon atoms.

Also, by "saturated or unsaturated, linear or branched hydrocarbon group having 1 to 12 carbon atoms and optionally one or more heteroatoms" it is meant any group formed of a straight or branched hydrocarbon chain having 1, 2, 3, 4, 5, 6, 7, 8, 9, 10, 11 or 12 carbon atoms, the chain of which can be saturated or, on the contrary, may contain one or more double or triple bonds, and the chain possibly being interrupted by one or more heteroatoms or substituted by one or more heteroatoms or by one or more substituents comprising a heteroatom.

In this respect, it is specified that by "heteroatom" it is meant any atom other than carbon and hydrogen, this atom typically being a nitrogen, oxygen or sulfur atom.

Also, by "saturated or unsaturated, monocyclic hydrocarbon group having 3 to 8 carbon atoms and optionally one or more heteroatoms" it is meant any cyclic hydrocarbon group comprising only one ring and the ring comprising 3, 4, 5, 6, 7 or 8 carbon atoms. This ring can be saturated or, on the contrary, it may comprise one or more double or triple bonds, and may comprise one or more heteroatoms or may be substituted by one or more heteroatoms or by one or more substituents comprising a heteroatom, this or these heteroatoms typically being N, O or S. Therefore, this group may notably be a cycloalkyl, cycloalkenyl or cycloalkynyl group (e.g. a cyclopropane, cyclopentane, cyclohexane, cyclopropenyl, cyclopentenyl or cyclohexenyl group), a saturated heterocyclic group (e.g. a tetrahydrofuryl, tetrahydrothiophenyl, pyrrolidinyl or piperidinyl group), an unsaturated but non-aromatic heterocyclic group (e.g. pyrrolinyl or pyridinyl), an aromatic group or a heteroaromatic group.

In this respect, it is specified that by "aromatic group" it is meant any group with a ring meeting Hackers rule of aromaticity and therefore having a number of delocalized electrons π of 4n+2 (e.g. a phenyl or benzyl group), whilst by "heteroaromatic group" it is meant any aromatic group such as just defined but having a ring comprising one or more heteroatoms, this or these heteroatoms typically being selected from among nitrogen, oxygen and sulfur atoms (e.g. a furyl, thiophenyl or pyrrolyl group).

According to the invention, in above formula (I), $R^1$ and $R^2$, either identical or different, are advantageously a linear or branched alkyl group having 6 to 12 carbon atoms.

Further, it is preferred that $R^1$ and $R^2$ are identical and are a branched alkyl group having 8 to 10 carbon atoms, particular preference being given to the 2-ethylhexyl group.

Also, in above formula (I), $R^3$ is advantageously a linear or branched alkyl group having 1 to 12 carbon atoms, or a monocyclic 6-membered aromatic group, preferably phenyl or ortho-, meta- or para-tolyl.

Further, it is preferred that $R^3$ should be a methyl, n-octyl or phenyl group.

Finally, in above formula (I), $R^4$ is preferably a linear or branched alkyl group having 2 to 8 carbon atoms and, better still, 2 to 4 carbon atoms such as an ethyl, n-propyl, isopropyl, n-butyl, sec-butyl, isobutyl or Cert-butyl group, the ethyl and n-butyl groups being more particularly preferred, whilst $R^5$ is preferably a hydrogen atom.

Compounds of above formula (I) having these characteristics are in particular:
ethyl 1-(N,N-diethylhexylcarbamoyl)ethylphosphonate, denoted DEHCEPE, meeting above formula (I) where $R^1$ and $R^2$ are a 2-ethylhexyl group, $R^3$ is a methyl group, $R^4$ is an ethyl group and $R^5$ is a hydrogen atom;
ethyl 1-(N,N-diethylhexylcarbamoyl)nonylphosphonate, denoted DEHCNPE, meeting above formula (I) where $R^1$ and $R^2$ are a 2-ethylhexyl group, $R^3$ is an n-octyl group, $R^4$ is an ethyl group and $R^5$ is a hydrogen atom;
butyl 1-(N,N-diethylhexylcarbamoyl)nonylphosphonate, denoted DEHCNPB, meeting above formula (I) where $R^1$ and $R^2$ are a 2-ethylhexyl group, $R^3$ is an n-octyl group, $R^4$ is an n-butyl group and $R^5$ is a hydrogen atom;
butyl 1-(N,N-dioctylcarbamoyl)nonylphosphonate, denoted DOCNPB, meeting above formula (I) where $R^1$, $R^2$ and $R^3$ are an n-octyl group, $R^4$ is an n-butyl group and $R^5$ is a hydrogen atom; and
butyl 1-(N,N-diethylhexylcarbamoyl)benzylphosphonate, denoted DEHCPBE, meeting above formula (I) where $R^1$ and $R^2$ are a 2-ethylhexyl group, $R^3$ is a phenyl group, $R^4$ is an ethyl group and $R^5$ is a hydrogen atom.

Among these compounds, particular preference is given to DEHCNPB.

It is to be noted that all the compounds meeting above formula (I) can be obtained via the synthesis routes described in international PCT application published under number WO 2013/167516, referenced [2] below.

According to the invention, the surfactant can be selected from among ionic surfactants, i.e. anionic, cationic and zwitterionic (or amphoteric), and non-ionic surfactants, provided that it allows the forming of a microemulsion in a non-water miscible organic phase, i.e. a water-in-oil dispersion that is isotropic and thermodynamically stable.

For the choice of said surfactant, the reader is invited to refer to the works "Chemistry and Technology of Surfactants" (Richard J. Farn, 2006 Blackwell Publishing Ltd, ISBN-13: 978-14051-2696-0) and "Self-Organized Surfactant Structures" (Tharwat F Tadros, 2011, John Wiley & Sons, ISBN: 978-3-527-63265-7), referenced [3] and [4] below.

Preferably, the surfactant is an ionic surfactant and more especially an anionic surfactant, i.e. a surfactant which separates in an aqueous solution into an amphiphilic cation and an anion, in which case it can particularly be selected from the (sodium, potassium, magnesium, calcium, ammonium, . . . ) salts of alkylsulfates, alkylarylethersulfates, alkylethersulfates, alkylarylethersulfates, alkylethercarboxylates, alkylarylethercarboxylates, alkylsulfosuccinates, alkylarylsulfosuccinates, paraffin sulfonates, alkylisothionates, alkylsarcosinates, the alkyl group(s) of these compounds preferably having 6 to 24 carbon atoms and, better still, 6 to 12 carbon atoms, the aryl group(s) of these compounds preferably being phenyl group(s).

According to the invention, the surfactant is preferably a salt of a dialkyl($C_6$-$C_{12}$)sulfosuccinate such as an alkali metal salt, for example (e.g. Na, K, . . . ) of di(n-hexyl)sulfosuccinate, di(2-ethylhexyl)sulfosuccinate, di(n-octyl)sulfosuccinate (also called docusate), di(i-octyl)sulfosuccinate or di(n-decyl)sulfosuccinate, the salts of di(2-ethylhexyl)sulfosuccinate and, in particular, the sodium salt of di(2-ethylhexyl)sulfosuccinate, also called AOT, the formula of which is recalled below, being more particularly preferred.

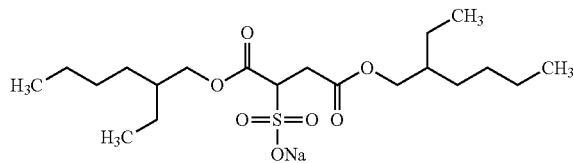

In addition, the extractant preferably has a molar ratio of the compound to the surfactant ranging from 20:80 to 80:20 and, better still, from 40:60 to 60:40, a molar ratio of 60:40 being most particularly preferred for an extractant comprising DEHCNPB as compound and AOT as surfactant, since it leads to maximum synergic effect when extracting rare earths from an aqueous phosphoric acid solution.

A further subject of the invention is the use of an extractant such as just defined to extract at least one rare earth from an aqueous phosphoric acid solution.

According to the invention, said at least one rare earth is preferably extracted from the aqueous phosphoric acid solution via liquid-liquid extraction, in which case this aqueous solution is placed in contact with an organic solution comprising the extractant in an organic diluent of linear or branched dodecane type such as n-dodecane or hydrogenated tetrapropylene, or of kerosene type such as the one marketed under the trade name IP-185, then separated from the organic solution.

The organic solution preferably comprises from 0.005 mol/L to 1 mol/L and better still 0.1 mol/L to 0.5 mol/L of extractant.

A further subject of the invention is a method for extracting at least one rare earth from an aqueous phosphoric acid solution, which comprises contacting the aqueous solution with a non-water miscible organic solution comprising an extractant in an organic diluent, then separating the aqueous and organic solutions, characterized in that the extractant is such as previously defined.

A further subject of the invention is a method for recovering at least one rare earth from an aqueous phosphoric acid solution, characterized in that it comprises:
  extracting said at least one rare earth from the aqueous solution by contacting the aqueous solution with a non-water miscible organic solution comprising an extractant such as previously defined in an organic diluent, then separating the aqueous and organic solutions; and
  stripping said at least one rare earth from the organic solution by contacting the organic solution with an aqueous solution of oxalic acid or a salt thereof, e.g. ammonium, sodium or potassium oxalate, then separating the aqueous and organic solutions.

In these extraction and recovery methods, the organic solution also preferably comprises 0.005 mol/L to 1 mol/L and, better still, 0.1 mol/L to 0.5 mol/L of extractant.

The aqueous phosphoric acid solution, from which said at least one rare earth is extracted or from which said at least one rare earth is recovered, can particularly be a solution issued from the leaching of a natural phosphate with sulfuric acid, or a solution issued from the leaching with phosphoric acid of an "urban ore", i.e. a mine formed of industrial and domestic waste from equipment containing rare earths and in particular WEEE or W3E equipment.

As previously indicated and as demonstrated below, the phosphoric acid concentration of this aqueous solution can vary over a wide range and in particular can range from 1 mol/L to 8 mol/L of phosphoric acid.

Other characteristics and advantages of the invention will become apparent from the following additional description which refers to the appended Figures and relates to examples demonstrating the efficiency of an extractant of the invention when extracting rare earths from an aqueous phosphoric acid solution.

This additional description is evidently given solely to illustrate the subject of the invention and must not under any circumstance be construed as limiting this subject.

In the foregoing and in the remainder hereof, the terms "solution" and "phase" are equivalent and fully interchangeable.

BRIEF DESCRIPTION OF THE FIGURES

FIG. 1A shows the trend in the distribution coefficients of the rare earths and iron, denoted $D_M$, as a function of the molar fraction of AOT, denoted $x_{AOT}$, of the extractant, whilst FIG. 1B shows the trend in the selectivity coefficients of the rare earths over iron, denoted $S_{Tr/Fe}$, as a function of $x_{AOT}$.

FIG. 2A shows the trend in the distribution coefficients of the rare earths and iron, denoted $D_M$, as a function of the concentration of the DEHCNPB and AOT mixture, denoted [DEHCNPB+AOT] and expressed in mol/L, in organic phase, whilst FIG. 2B shows the trend in the selectivity coefficients of the rare earths over iron, denoted $S_{Tr/Fe}$, as a function of [DEHCNPB+AOT], also expressed in mol/L.

FIG. 3A shows the distribution coefficients of the rare earths and iron, denoted $D_M$, obtained as a function of the acid contained in the aqueous phase, whilst FIG. 3B gives the selectivity coefficients of the rare earths over iron, denoted $S_{Tr/Fe}$, obtained as a function of the acid contained in the aqueous phase.

FIG. 4A shows the trend in the distribution coefficients of the rare earths and iron, denoted $D_M$, as a function of the concentration of phosphoric acid, denoted [$H_3PO_4$] and expressed in mol/L, in aqueous phase, whilst FIG. 4B shows the trend in the selectivity coefficients of the rare earths over iron, denoted $S_{Tr/Fe}$, as a function of [$H_3PO_4$].

DETAILED DESCRIPTION OF PARTICULAR EMBODIMENTS

Figure 1A:
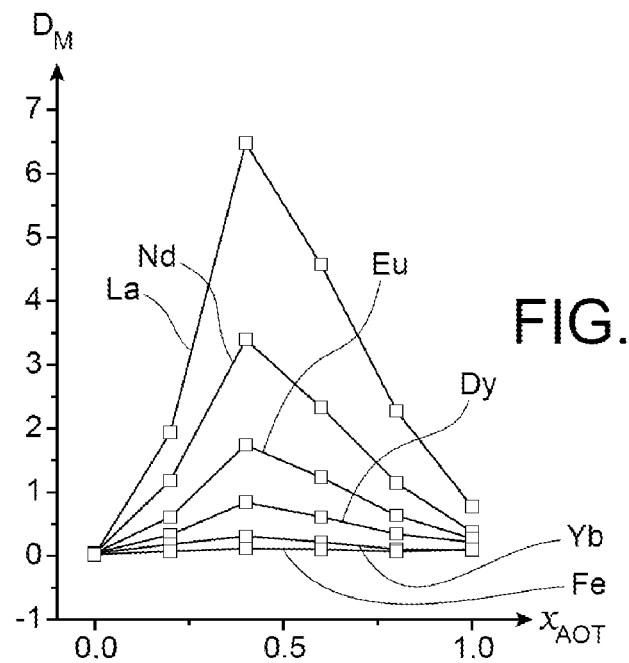
FIGS. 1A and 1B illustrate the results of extraction tests performed on aqueous phosphoric phases containing five rare earths and iron, using organic phases comprising as extractant either DEHCNPB, or AOT, or a mixture of DEHCNPB and AOT in different DEHCNPB/AOT molar ratios.

The experimental results reported in the following examples were obtained using aqueous acid phases comprising two light rare earths, namely lanthanum (La) and neodymium (Nd), and three heavy rare earths, namely europium (Eu), dysprosium (Dy) and ytterbium (Yb).

The distribution coefficients, extraction yields and selectivity coefficients reported in the following examples were determined in accordance with conventional practice in the field of liquid-liquid extractions, namely that:

the distribution coefficient of a metal element M, denoted $D_M$, between two phases respectively organic and aqueous, is determined by the following equation:

$$D_M = \frac{[M]_{org,f}}{[M]_{aq,f}} = \frac{[M]_{aq,i} - [M]_{aq,f}}{[M]_{aq,f}}$$

where:
$[M]_{org,f}$ is the concentration of M in the organic phase after extraction,
$[M]_{aq,f}$ is the concentration of M in the aqueous phase after extraction, and
$[M]_{aq,i}$ is the concentration of M in the aqueous phase before extraction;
the extraction yield of a metal element M, denoted $R_M$, from an aqueous phase is determined by the following equation:

$$R_M = \frac{[M]_{org,f}}{[M]_{aq,i}} = \frac{D_M}{D_M + 1}$$

where $[M]_{org,f}$, $[M]_{aq,i}$ and $D_M$ have the same meaning as previously; whilst
the selectivity coefficient of a metal element M1 over a metal element M2, denoted $S_{M1/M2}$, is determined by the equation:

$$S_{M1/M2} = \frac{D_{M1}}{D_{M2}}$$

where:
$D_{M1}$ is the distribution coefficient of M1, and
$D_{M2}$ is the distribution coefficient of M2.

Example 1: Synergic Effect of a Mixture of DEHCNPB and AOT on the Extraction of Rare Earths from an Aqueous Phosphoric Acid Solution and Impact of the DEHCNPB/AOT Molar Ratio of this Mixture on the Extracting Properties Thereof The synergic effect of a mixture of DEHCNPB and AOT on the extraction of rare earths from an aqueous phosphoric acid solution and the impact of the DEHCNPB/AOT molar ratio of this mixture on its extracting properties were assessed by extraction tests performed using:

as aqueous phases: phases obtained by dissolving five salts of rare earths in oxidation state (III) in the respective forms: La(NO$_3$)$_3$, Nd(NO$_3$)$_3$, Eu(NO$_3$)$_3$, Dy(NO$_3$)$_3$ and Yb(NO$_3$)$_3$, in a proportion of 0.25 g/L of each of these salts, in solutions comprising 5 mol/L of phosphoric acid in ultrapure water (i.e. Milli-Q water, having resistivity of >18 MΩ/cm at 25° C.); and as organic phases: phases comprising 0.1 mol/L of an extractant in isooctane, this extractant being composed either solely of DEHCNPB, or solely of AOT, or of a mixture of DEHCNPB and AOT for which the molar ratio of DEHCNPB to AOT was varied.

Since iron is naturally contained as major impurity in ores and, in particular, in natural ores, the aqueous phases also comprised 2.5 g/L of iron(III) nitrate.

The extraction tests were conducted using an aqueous phase/organic phase volume ratio (A/O) of 1. The aqueous and organic phases were placed in contact for 1 hour at constant temperature (20° C.), after which they were separated from each other via centrifugation (4 000 rpm) for 20 minutes at 20° C.

The concentrations of the rare earths and iron in the aqueous phases were measured by inductively coupled plasma optical emission spectrometry (ICP-OES) before and after extraction.

The results of these tests are given in Table 1 below indicating the extraction yields of the rare earths and iron, denoted $R_M$, as a function of the AOT molar fraction, denoted $x_{AOT}$, of the extractant system, as well as in FIGS.

Figure 1B:
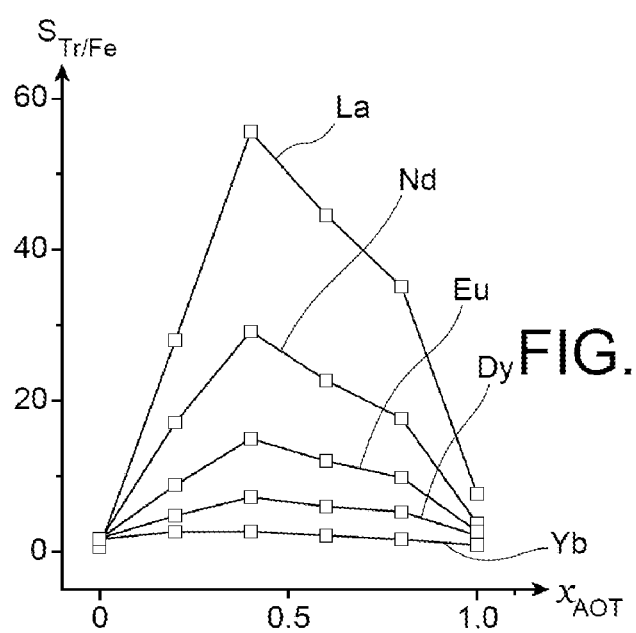

1A and 1B showing the trend in the distribution coefficients of the rare earths and iron, denoted $D_M$, as a function of $x_{AOT}$ (FIG. 1A), and the trend in the selectivity coefficients of the rare earths over iron, denoted $S_{Tr/Fe}$, as a function of $x_{AOT}$ (FIG. 1B).

In this Table and in these Figures, the results given for $x_{AOT}=0$ correspond to the results obtained for the extractant composed solely of DEHCNPB, whilst the results given for $x_{AOT}=1$ correspond to the results obtained for the extractant composed solely of AOT.

TABLE 1

| $x_{AOT}$ | $R_M$ | | | | | |
|---|---|---|---|---|---|---|
| | La | Nd | Eu | Dy | Yb | Fe |
| 0 | 0.01 | 0.03 | 0.04 | 0.04 | 0.04 | 0.02 |
| 0.2 | 0.66 | 0.54 | 0.38 | 0.25 | 0.15 | 0.06 |
| 0.4 | 0.87 | 0.77 | 0.64 | 0.46 | 0.24 | 0.10 |
| 0.6 | 0.82 | 0.70 | 0.55 | 0.38 | 0.18 | 0.09 |
| 0.8 | 0.69 | 0.53 | 0.39 | 0.25 | 0.09 | 0.06 |
| 1 | 0.44 | 0.27 | 0.21 | 0.18 | 0.08 | 0.09 |

These results show that, for all the rare earths, the extraction yields obtained with an extractant composed of a mixture of DEHCNPB and AOT are higher than the sum of the extraction yields obtained with an extractant composed solely of DEHCNPB and an extractant composed solely of AOT, thereby indicating a synergic effect of the mixture of DEHCNPB and AOT on the extraction of all these rare earths (Table 1).

They also show that the highest synergic effect of the DEHCNPB and AOT mixture is observed with an AOT molar fraction of 0.4 (i.e. a DEHCNPB/AOT molar ratio of 60:40) with the obtaining of distribution coefficients for lanthanum, neodymium, europium, dysprosium and ytterbium of respectively 6.4, 3.4, 1.74, 0.81 and 0.32 (FIG. 1A) and of extraction yields of these same elements of respectively 0.87, 0.77, 0.64, 0.46 and 0.24 (Table 1).

They further show that the highest selectivity of the DEHCNPB and AOT mixture for rare earths over iron is also obtained with the AOT molar fraction of 0.4, with the obtaining of selectivity coefficients $S_{La/Fe}$, $S_{Nd/Fe}$, $S_{Eu/Fe}$, $S_{Dy/Fe}$ and $D_{Yb/Fe}$ of respectively 59, 28.7, 15.0, 6.8 and 2.3.

Example 2: Impact of the Concentration of a Mixture of DEHCNPB and AOT in Organic Phase on the Efficiency of this Mixture for the Extraction of Rare Earths from an Aqueous Phosphoric Acid Solution The impact of the concentration of a DEHCNPB and AOT mixture in organic phase on the efficiency of this mixture for the extraction of rare earths from an aqueous phosphoric acid solution was assessed with extraction tests performed using:

as aqueous phases: the same aqueous phases as used in Example 1 above; and
as organic phases: phases comprising from 0.003 mol/L to 0.5 mol/L of a DEHCNPB and AOT mixture, in a DEHCNPB/AOT molar ratio of 60:40, in isooctane.

Extractions were conducted under the same conditions as those described in Example 1 above.

Figure 2A:
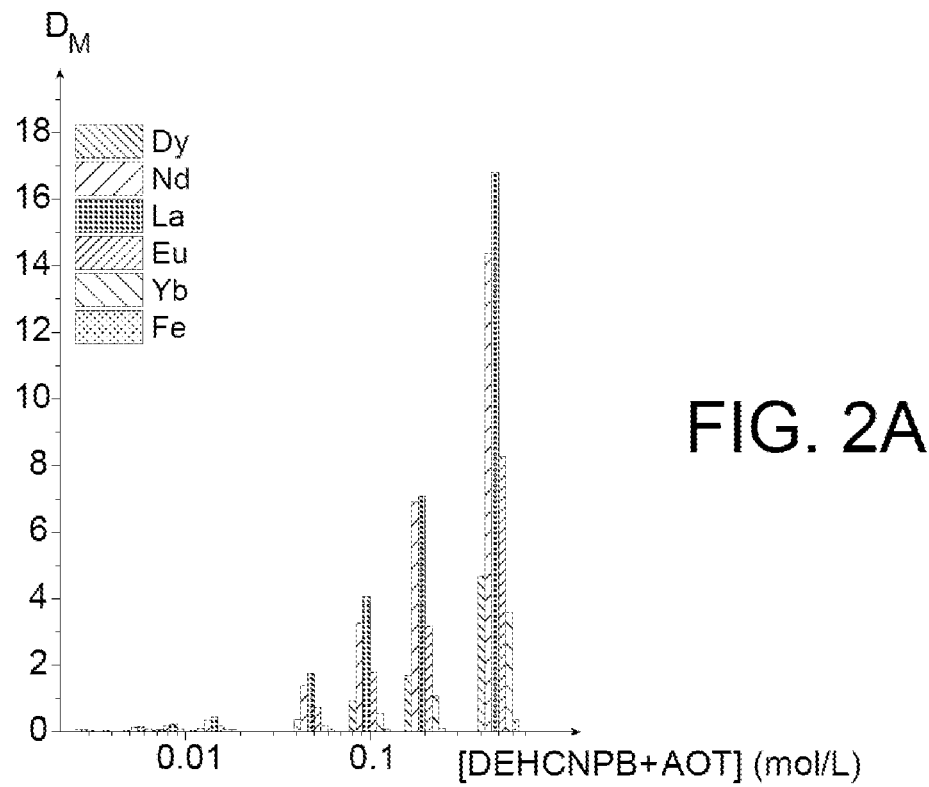
FIGS. 2A and 2B illustrate the results of extraction tests performed on aqueous phosphoric phases containing five rare earths and iron, using organic phases comprising as extractant a mixture of DEHCNPB and AOT (DEHCNPB/AOT molar ratio: 60:40) at different concentrations.
Figure 2B:
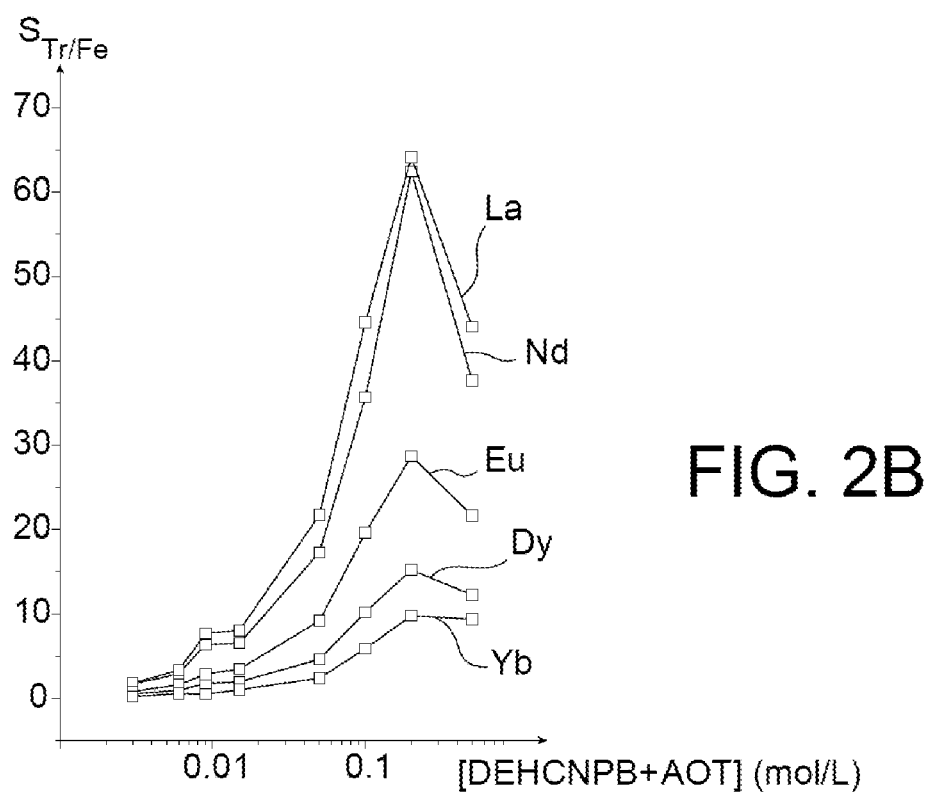

The results of these tests are given in Table 2 below, indicating the extraction yields of rare earths and iron, denoted $R_M$, as a function of the molar concentration of the DEHCNPB and AOT mixture, denoted [DEHCNPB+AOT] and expressed in mol/L, and in FIGS. 2A and 2B showing the trend in the distribution coefficients of the rare earths and iron, denoted $D_M$, as a function of [DEHCNPB+AOT] (FIG. 2A) and the trend in the selectivity coefficients of the rare earths over iron, denoted $S_{Tr/Fe}$, as a function of [DEHCNPB+AOT] (FIG. 2B).

TABLE 2

| [DEHCNPB + AOT] | $R_M$ | | | | | |
|---|---|---|---|---|---|---|
| (mol/L) | La | Nd | Eu | Dy | Yb | Fe |
| 0.003 | 0.06 | 0.06 | 0.03 | 0.02 | 0.01 | 0.03 |
| 0.006 | 0.13 | 0.12 | 0.07 | 0.04 | 0.03 | 0.04 |
| 0.009 | 0.19 | 0.16 | 0.08 | 0.05 | 0.01 | 0.03 |
| 0.015 | 0.31 | 0.27 | 0.16 | 0.10 | 0.05 | 0.05 |
| 0.05 | 0.64 | 0.58 | 0.43 | 0.27 | 0.16 | 0.07 |
| 0.1 | 0.80 | 0.77 | 0.64 | 0.48 | 0.35 | 0.08 |
| 0.2 | 0.88 | 0.87 | 0.76 | 0.63 | 0.52 | 0.10 |
| 0.5 | 0.94 | 0.93 | 0.89 | 0.82 | 0.78 | 0.28 |

These results show that the extraction of rare earths and iron increases with the concentration of the DEHCNPB and AOT mixture in the organic phase, with the obtaining of distribution coefficients for lanthanum, neodymium, europium, dysprosium, ytterbium and iron of respectively 7.08, 6.90, 3.17, 1.68, 1.08 and 0.11 for a concentration of this mixture of 0.2 mol/L (FIG. 2A).

They also show that it is possible to obtain even higher distribution coefficients when using a DEHCNPB and AOT mixture at a molar concentration higher than 0.2 mol/L, e.g. 0.5 mol/L, but that a drop in the selectivity of this mixture for the rare earths over iron is then observed (FIG. 2B).

Example 3: Impact of the Type of Acid Contained in an Aqueous Solution on the Efficiency of the Mixture of DEHCNPB and AOT for the Extraction of Rare Earths from this Solution The impact of the type of acid contained in an aqueous solution on the efficiency of a DEHCNPB and AOT mixture for the extraction of rare earths from this solution was assessed with extraction tests performed using:

as aqueous phases: phases obtained by dissolving 0.25 g/L of each of the following salts La(NO$_3$)$_3$, Nd(NO$_3$)$_3$, Eu(NO$_3$)$_3$, Dy(NO$_3$)$_3$ and Yb(NO$_3$)$_3$, and 2.5 g/L of Fe(NO$_3$)$_3$, in solutions comprising 5 mol/L of an acid in ultrapure water, this acid being either nitric acid, or hydrochloric acid, or sulfuric acid or phosphoric acid; and
as organic phases: phases comprising 0.1 mol/L of a mixture of DEHCNPB and AOT, in a DEHCNPB/AOT molar ratio of 60:40, in isooctane.

Extractions were conducted under the same conditions as those described in Example 1 above.

Figure 3A:
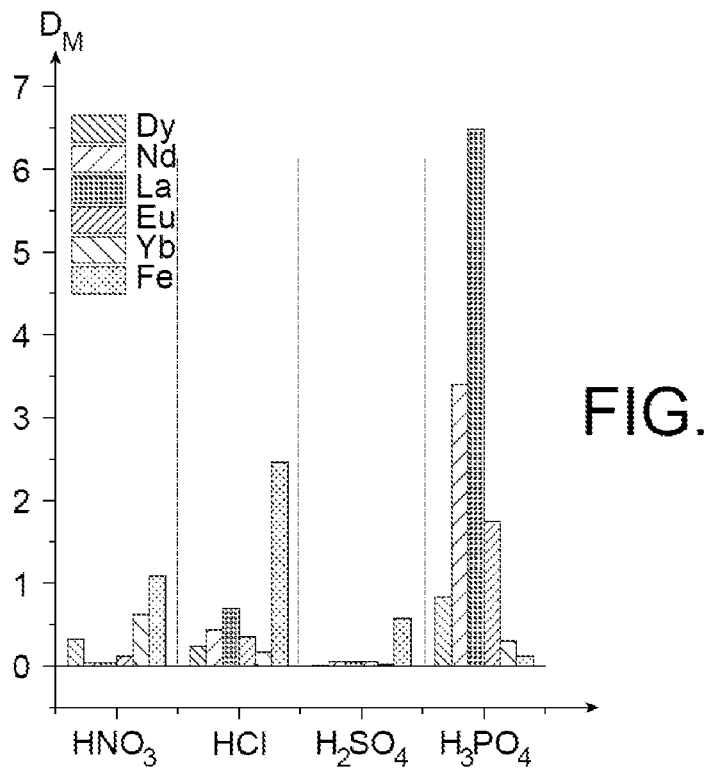
FIGS. 3A and 3B illustrate the results of extraction tests performed on aqueous acid phases containing five rare earths and iron and comprising as acid either nitric acid or hydrochloric acid or sulfuric acid or phosphoric acid, using organic phases comprising as extractant a mixture of DEHCNPB and AOT (DEHCNPB/AOT molar ratio: 60:40)
Figure 3B:
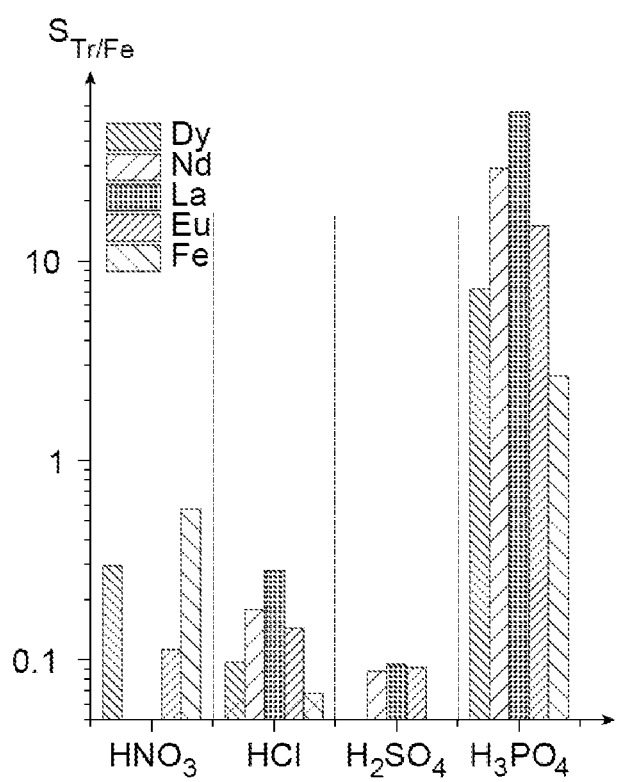

The results of these tests are illustrated in FIGS. 3A and 3B giving the distribution coefficients of the rare earths and iron, denoted $D_M$, obtained for each acid (FIG. 3A) and the selectivity coefficients of the rare earths over iron, denoted log($S_{Tr/Fe}$), obtained for each acid (FIG. 3B).

These results show that the highest efficiency of the DEHCNBE/AOT mixture to extract rare earths from an aqueous acid solution is obtained when the acid contained in this solution is phosphoric acid (FIG. 3A).

The extraction of rare earths from an aqueous solution of nitric acid, hydrochloric acid or sulfuric acid is very low and non-selective over iron (FIG. 3B).

Example 4: Impact of the Phosphoric Acid Concentration in an Aqueous Solution on the Efficiency of a Mixture of DEHCNPB and AOT for the Extraction of Rare Earths from this Solution The impact of the phosphoric acid concentration in an aqueous solution on the efficiency of a DEHCNPB and AOT mixture for the extraction of rare earths from this solution was assessed with extraction tests performed using:
- as aqueous phases: phases obtained by dissolving 0.25 g/L of each of the following salts: $La(NO_3)_3$, $Nd(NO_3)_3$, $Eu(NO_3)_3$, $Dy(NO_3)_3$ and $Yb(NO_3)_3$, and 2.5 g/L of $Fe(NO_3)_3$ in solutions comprising 2 mol/L to 7 mol/L of phosphoric acid in ultrapure water; and
- as organic phases: phases comprising 0.2 mol/L of a DEHCNPB and AOT mixture, in a DEHCNPB/AOT molar ratio of 60:40, in isooctane.

The extractions were conducted under the same conditions as those described in Example 1 above.

Figure 4A:
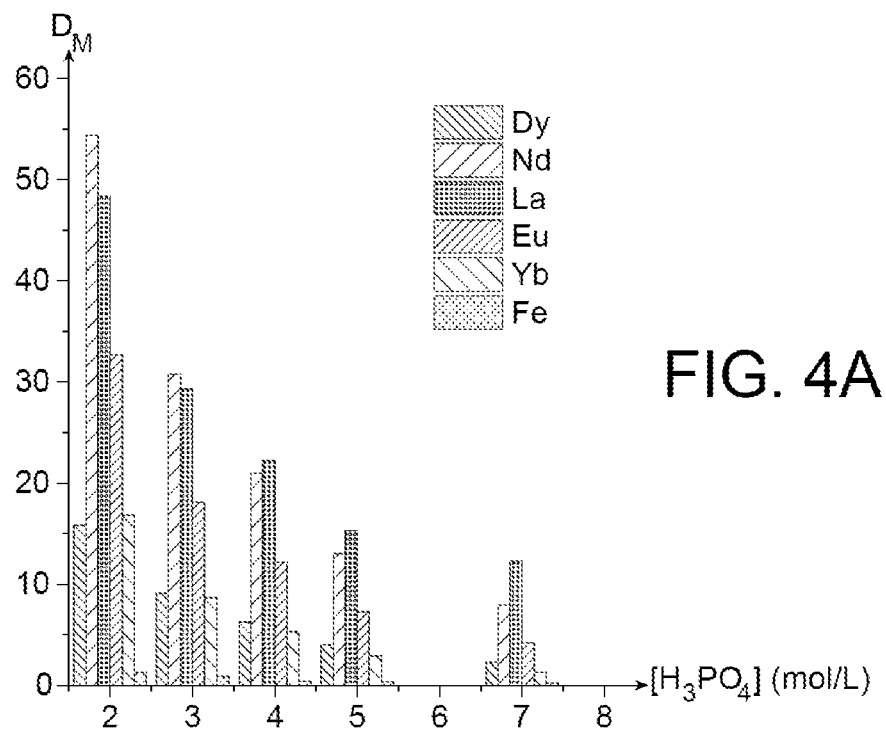
FIGS. 4A and 4B illustrate the results of extraction tests performed on aqueous phases containing five rare earths and iron and comprising phosphoric acid at different concentrations, using organic phases comprising as extractant a mixture of DEHCNPB and AOT (DEHCNPB/AOT molar ratio: 60:40)
Figure 4B:
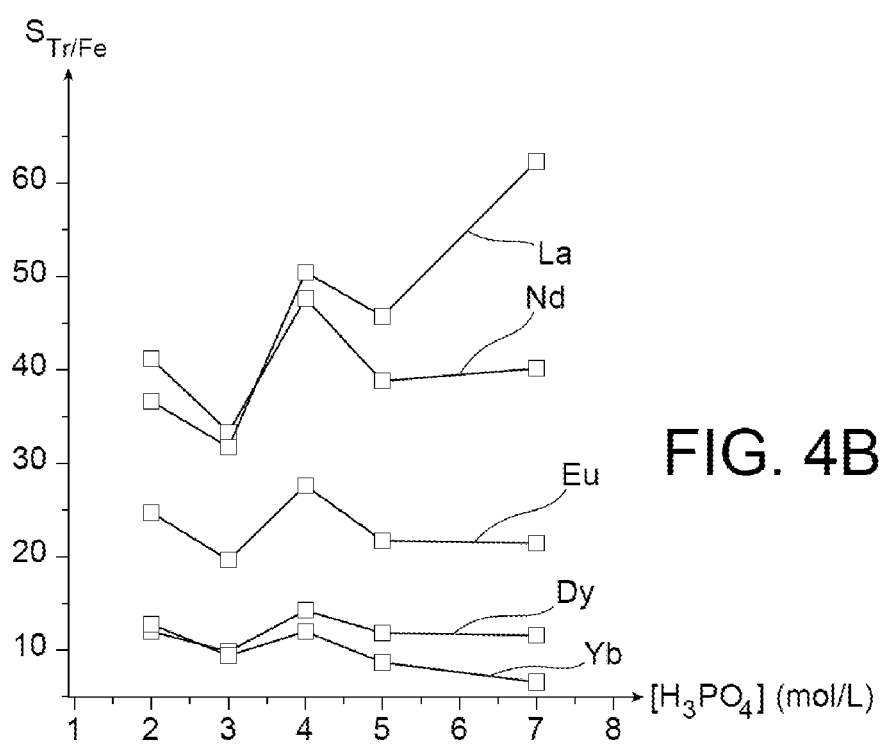

The results of these tests are given in Table 3 below, indicating the extraction yields of the rare earths and iron, denoted $R_M$, as a function of the molar concentration of phosphoric acid, denoted $[H_3PO_4]$ and expressed in mol/L, and in FIGS. 4A and 4B showing the trend in the distribution coefficients of the rare earths and iron, denoted $D_M$, as a function of $[H_3PO_4]$, expressed in mol/L (FIG. 4A), and the trend in the selectivity coefficients of the rare earths over iron, denoted $S_{Tr/Fe}$, as a function of $[H_3PO_4]$, also expressed in mol/L (FIG. 4B).

TABLE 3

| $[H_3PO_4]$ | $R_M$ | | | | | |
|---|---|---|---|---|---|---|
| (mol/L) | La | Nd | Eu | Dy | Yb | Fe |
| 2 | 0.98 | 0.98 | 0.97 | 0.94 | 0.94 | 0.57 |
| 3 | 0.97 | 0.97 | 0.95 | 0.90 | 0.90 | 0.48 |
| 4 | 0.96 | 0.95 | 0.92 | 0.86 | 0.84 | 0.31 |
| 5 | 0.94 | 0.93 | 0.88 | 0.80 | 0.74 | 0.25 |
| 7 | 0.92 | 0.89 | 0.81 | 0.70 | 0.56 | 0.16 |

These results show that in accordance with reporting in the literature for cationic exchanger extractants (R. Turgis et al., Solvent Extr. Ion Exch. 2014, 32(7), 685-702, referenced [5] below), the efficiency of the DEHCNBE and AOT mixture for the extraction of rare earths from an aqueous acid phase decreases with the increase in acidity of this phase.

Nevertheless, extraction remains efficient even at a phosphoric acid concentration of 7-8 mol/L, with distribution coefficients for lanthanum, neodymium, europium, dysprosium, ytterbium and iron of respectively 12.27, 7.90, 4.22, 2.28, 1.29 and 0.20 (FIG. 4A).

Regarding the selectivity of the DEHCNBE and AOT mixture for rare earths over iron, FIG. 4B shows that it is very little impacted by the concentration of phosphoric acid in aqueous phase.

Example 5: Impact of Extraction Temperature on the Efficiency of a Mixture of DEHCNPB and AOT for the Extraction of Rare Earths from an Aqueous Phosphoric Acid Solution The impact of the temperature at which extraction is performed on the efficiency shown by a DEHCNPB and AOT mixture to extract rare earths from an aqueous phosphoric acid solution was assessed with extraction tests performed using:
- as aqueous phases: the same aqueous phases as those used in Example 1 above; and
- as organic phases: phases comprising 0.2 mol/L of a mixture of DEHCNPB and AOT, in a DEHCNPB/AOT molar ratio of 60:40, in isooctane.

The extractions were conducted under the same conditions as those described in Example 1 above, with the exception that they were conducted at temperatures of 30° C., 40° C., 50° C. and 60° C.

Figure 5:
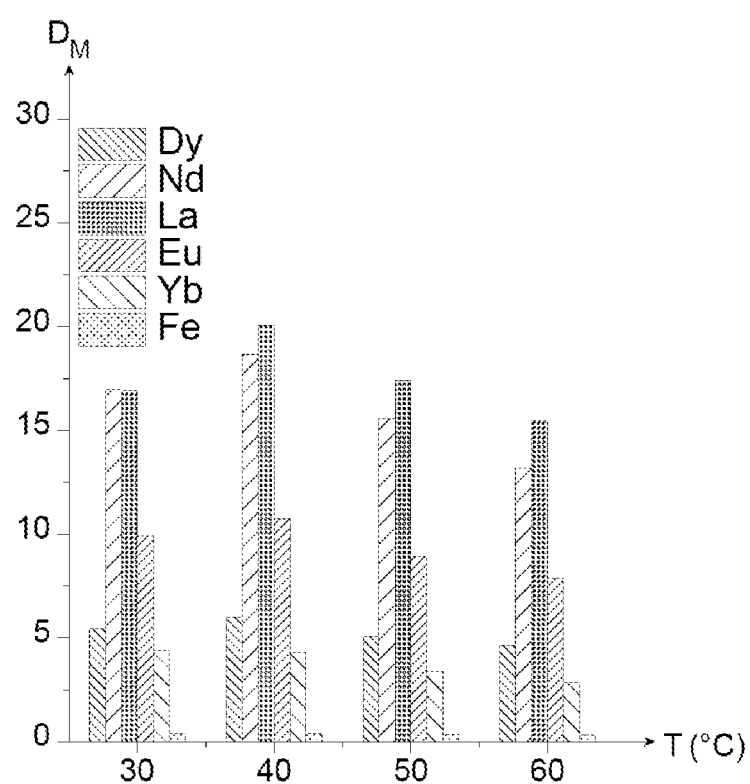
FIG. 5 illustrates the results of extraction tests performed at different temperatures on aqueous phosphoric phases containing five rare earths and iron, using organic phases comprising as extractant a mixture of DEHCNPB and AOT (DEHCNPB/AOT molar ratio: 60:40); this Figure shows the trend in the distribution coefficients of the rare earths and iron, denoted $D_M$, as a function of temperature, denoted T and expressed in °C.

The results of these tests are given in Table 4 below indicating the extraction yields of the rare earths and iron, denoted $R_M$, as a function of temperature, denoted T and expressed in ° C., and in FIG. 5 showing the trend in the distribution coefficients of the rare earths and iron, denoted $D_M$, as a function of T.

TABLE 4

| T (° C.) | Fe | La | Nd | Eu | Dy | Yb |
|---|---|---|---|---|---|---|
| 30 | 0.29 | 0.94 | 0.94 | 0.91 | 0.84 | 0.81 |
| 40 | 0.29 | 0.95 | 0.95 | 0.91 | 0.86 | 0.81 |
| 50 | 0.25 | 0.95 | 0.94 | 0.90 | 0.84 | 0.77 |
| 60 | 0.23 | 0.94 | 0.93 | 0.89 | 0.82 | 0.74 |

These results show that the extraction of rare earth and iron only appears to be scarcely dependent on the temperature at which this extraction is performed.

An extraction peak at 40° C. was nonetheless observed, allowing distribution coefficients to be reached for lanthanum, neodymium, europium, dysprosium, ytterbium and iron of respectively 20.04, 18.66, 10.74, 6.01, 4.30 and 0.4.

The selectivity of the DEHCNPE and AOT mixture for the rare earths over iron was also very little impacted by the temperature at which extraction was performed since the extraction itself is scarcely dependent on this temperature.

Example 6: Stripping Tests

Stripping tests were performed using:
- a plurality of organic phases comprising from 0.01 mol/L to 0.5 mol/L of a DEHCNPB and AOT mixture, in a DEHCNPB/AOT molar ratio of 60:40, in n-dodecane, previously loaded with La, Nd, Eu, Dy, Yb and Fe via contact with an aqueous solution comprising 0.25 g/L of each of these rare earths, 2.5 g/L of iron and 8 mol/L of phosphoric acid; and
- an aqueous phase comprising 0.2 mol/L of ammonium oxalate $C_2H_8N_2O_4$.

For this test, 2 mL of each of the organic phases (containing most of the rare earths initially present in the aqueous solution and traces of iron) were placed in contact and left under agitation, for 1 hour at ambient temperature (24° C.), with 2 mL of the aqueous phase. After settling of the organic and aqueous phases, a white precipitate was formed containing the rare earths complexed by the oxalate.

Rare earths can therefore be stripped in an aqueous phase in the form of oxalates and later converted to oxides by calcining these oxalates.

CITED REFERENCES

[1] M. Krea and H. Khalaf, Hydrometallurgy 2000, 58(3), 215-225.
[2] International application PCT WO 2013/167516.
[3] "Chemistry and Technology of Surfactants", Richard J. Farn, 2006 Blackwell Publishing Ltd, ISBN-13: 978-14051-2696-0.

[4] "Self-Organized Surfactant Structures", Tharwat F Tadros, 2011, John Wiley & Sons, ISBN: 978-3-527-63265-7.
[5] R. Turgis et al., *Solvent Extr. Ion Exch.* 2014, 32(7), 685-702.

What is claimed is:

1. An extractant comprising:
a compound of formula (I):

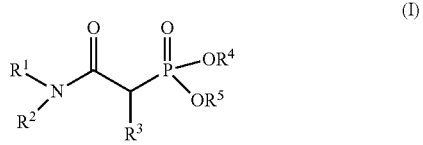

where:
- $R^1$ and $R^2$, either identical or different, are a saturated or unsaturated, linear or branched hydrocarbon group having 6 to 12 carbon atoms;
- $R^3$ is: a saturated or unsaturated, linear or branched hydrocarbon group having 1 to 12 carbon atoms and optionally one or more heteroatoms; or
a saturated or unsaturated, monocyclic hydrocarbon group having 3 to 8 carbon atoms and optionally one or more heteroatoms;
- $R^4$ and $R^5$, either identical or different, are a hydrogen atom, or a saturated or unsaturated, linear or branched hydrocarbon group having 2 to 8 carbon atoms; and
a surfactant.

2. The extractant of claim 1, in which $R^1$ and $R^2$, either identical or different, are a linear or branched alkyl group having 6 to 12 carbon atoms.

3. The extractant of claim 2, in which $R^1$ and $R^2$ are identical and are a branched alkyl group having 8 to 10 carbon atoms.

4. The extractant of claim 1, in which $R^3$ is a linear or branched alkyl group having 1 to 12 carbon atoms, or a 6-membered monocyclic aromatic group.

5. The extractant of claim 1, in which $R^4$ is a linear or branched alkyl group having 2 to 8 carbon atoms.

6. The extractant of claim 1, in which $R^5$ is a hydrogen atom.

7. The extractant of claim 1, in which the compound is:
ethyl 1-(N,N-diethylhexylcarbamoyl)ethylphosphonate of formula (I) where $R^1$ and $R^2$ are a 2-ethylhexyl group, $R^3$ is a methyl group, $R^4$ is an ethyl group and $R^5$ is a hydrogen atom;
ethyl 1-(N,N-diethylhexylcarbamoyl)nonylphosphonate of formula (I) where $R^1$ and $R^2$ are a 2-ethylhexyl group, $R^3$ is an n-octyl group, $R^4$ is an ethyl group and $R^5$ is a hydrogen atom;
butyl 1-(N,N-diethylhexylcarbamoyl)nonylphosphonate of formula (I) where $R^1$ and $R^2$ are a 2-ethylhexyl group, $R^3$ is an n-octyl group, $R^4$ is an n-butyl group and $R^5$ is a hydrogen atom;
butyl 1-(N,N-dioctylcarbamoyl)nonylphosphonate of formula (I) where $R^1$, $R^2$ and $R^3$ are an n-octyl group, $R^4$ is an n-butyl group and $R^5$ is a hydrogen atom; or
ethyl 1-(N,N-diethylhexylcarbamoyl)benzylphosphonate of formula (I) where $R^1$ and $R^2$ are a 2-ethylhexyl group, $R^3$ is a phenyl group, $R^4$ is an ethyl group and $R^5$ is a hydrogen atom.

8. The extractant of claim 7, in which the compound is butyl 1-(N,N-diethylhexylcarbamoyl)nonylphosphonate.

9. The extractant claim 1, in which the surfactant is an ionic surfactant.

10. The extractant of claim 9, in which the surfactant is a salt of a dialkyl($C_6$-$C_{12}$)sulfosuccinate.

11. The extractant of claim 10, in which the dialkyl($C_6$-$C_{12}$)sulfosuccinate is di(2-ethylhexyl)sulfosuccinate.

12. The extractant of claim 1, which has a molar ratio of the compound to the surfactant ranging from 20:80 to 80:20.

13. The extractant of claim 4, in which $R^3$ is a methyl, n-octyl or phenyl group.

14. The extractant of claim 11, in which the surfactant is a sodium salt of di(2-ethylhexyl)sulfosuccinate.

15. A method for extracting at least one rare earth from an aqueous phosphoric acid solution, comprising contacting the aqueous solution with a non-water miscible organic solution comprising an extractant in an organic diluent, then separating the aqueous solution and the organic solution, in which the extractant comprises:
a compound of formula (I):

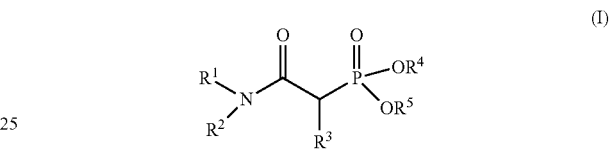

where:
- $R^1$ and $R^2$, either identical or different, are a saturated or unsaturated, linear or branched hydrocarbon group having 6 to 12 carbon atoms;
- $R^3$ is:
a saturated or unsaturated, linear or branched hydrocarbon group having 1 to 12 carbon atoms and optionally one or more heteroatoms; or
a saturated or unsaturated, monocyclic hydrocarbon group having 3 to 8 carbon atoms and optionally one or more heteroatoms;
- $R^4$ and $R^5$, either identical or different, are a hydrogen atom, or a saturated or unsaturated, linear or branched hydrocarbon group having 2 to 8 carbon atoms; and
a surfactant.

16. The method of claim 15, in which the organic solution comprises from 0.005 mol/L to 1 mol/L of the extractant.

17. The method of claim 15, in which the aqueous phosphoric acid solution is a solution issued from a leaching of a natural phosphate with sulfuric acid.

18. The method of claim 15, in which the aqueous phosphoric acid solution is a solution issued from a leaching of industrial and domestic waste from equipment comprising rare earths.

19. A method for recovering at least one rare earth from an aqueous phosphoric acid solution, comprising:
extracting the at least one rare earth from the aqueous solution by contacting the aqueous phosphoric acid solution with a non-water miscible organic solution comprising an extractant in an organic diluent, the extractant comprising:
a compound of formula (I):

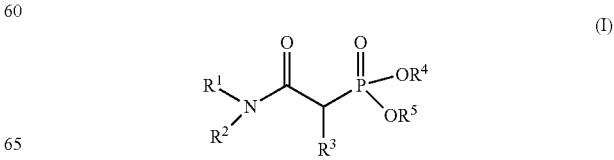

where:
- $R^1$ and $R^2$, either identical or different, are a saturated or unsaturated, linear or branched hydrocarbon group having 6 to 12 carbon atoms;
- $R^3$ is:
  - a saturated or unsaturated, linear or branched hydrocarbon group having 1 to 12 carbon atoms and optionally one or more heteroatoms; or
  - a saturated or unsaturated, monocyclic hydrocarbon group having 3 to 8 carbon atoms and optionally one or more heteroatoms;
- $R^4$ and $R^5$, either identical or different, are a hydrogen atom, or a saturated or unsaturated, linear or branched hydrocarbon group having 2 to 8 carbon atoms; and
- a surfactant;
  - separating the aqueous phosphoric acid solution and the organic solution;
    - stripping the at least one rare earth from the organic solution by contacting the organic solution with an aqueous solution of oxalic acid or salt thereof; and
  - separating the aqueous solution of oxalic acid or a salt thereof and the organic solution.

\* \* \* \* \*